Oct. 16, 1923.

B. T. WILLISTON

CHECK VALVE

Filed Feb. 4, 1921

1,471,229

Inventor
Belvin T. Williston

By Roberts, Roberts & Cushman
his Attorneys

Patented Oct. 16, 1923.

1,471,229

UNITED STATES PATENT OFFICE.

BELVIN T. WILLISTON, OF SOMERVILLE, MASSACHUSETTS, ASSIGNOR TO MANNING, MAXWELL & MOORE, INC., OF NEW YORK, N. Y., A CORPORATION OF NEW JERSEY.

CHECK VALVE.

Application filed February 4, 1921. Serial No. 442,394.

*To all whom it may concern:*

Be it known that I, BELVIN T. WILLISTON, a citizen of the United States, and resident of Somerville, in the county of Middlesex and State of Massachusetts, have invented new and useful Improvements in Check Valves, of which the following is a specification.

This invention relates to valve devices and more particularly to check valves for use in fluid transmission systems. One common source of trouble encountered in the use of such valves is the unequal side thrust to which the movable valve member is subjected as the fluid flows from beneath and laterally to one side of the same. Such lateral thrust results in unequal wear of the valve and valve seat and is especially injurious when coupled with the deteriorating effects of high temperature and fluid velocity such as are encountered in super-heated steam practice. Under such circumstances the valve and seat are rapidly and unsymmetrically eroded resulting in improper functioning and necessitating the replacement of the entire valve structure.

The principal object of the present invention is to provide a check valve whose parts shall be so arranged as to eliminate so far as practicable all eccentric side thrust of the fluid upon the movable valve member while also permitting the replacement of the valve seat when worn without necessitating renewal of the entire device.

A preferred embodiment of means for attaining the desired object is illustrated in the accompanying drawings in which—

Figure 1:
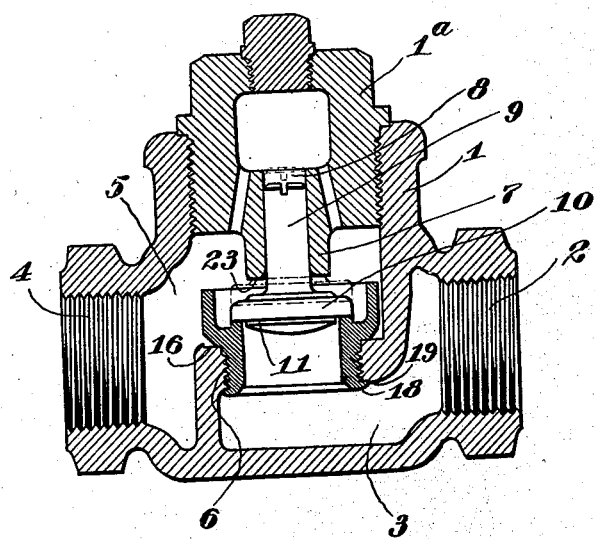
Figure 2:
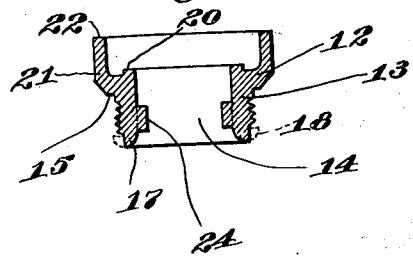

Fig. 1 is a vertical cross section of the complete check valve structure, showing the movable valve member in closed position; and Fig. 2 is a vertical cross section of the replaceable valve seat member before assemblage of the same with the valve casing.

The valve casing is indicated at 1 as having the internally screw threaded opening 2 for the attachment of the supply pipe, such opening leading to the intake chamber 3. At its opposite sides the casing is provided with the threaded opening 4 for attachment of the delivery pipe, such opening leading from the discharge chamber 5. Connecting the chambers 3 and 5 is an internally screw threaded passage 6. A boss 7 projects downwardly into the discharge chamber from a removable plug 1ª and has a bore 8 axially aligned with the passage 6. Such bore serves to guide a stem 9 affixed to a freely movable valve disk 10, such disk having the active surface 11.

The valve seat device 12 comprises a substantially cylindrical portion 13 which is externally screw threaded for engagement with the screw threads of the passage 6, such cylindrical portion having a central opening 14 for the passage of fluid from chamber 3 to the chamber 5. Outstanding from the cylindrical portion 13 at one end is a radial flange 15 adapted to engage a surface 16 of the casing adjacent one end of the passage 6. At its opposite end the member 13 is provided with a projection 17 so constructed that it may be bent to the position indicated at 18 in dotted lines in Fig. 2. When in such position the member 17 forms a second flange as shown in Figure 1 lying substantially parallel to the flange 15 and engaging a surface 19 of the casing at the opposite end of the passage 6. At its upper end the member 13 terminates in an annular valve seat 20 with which the surface 11 of the valve disk 10 cooperates.

Surrounding the valve seat 20 is an annular wall 21 formed integrally with the flange member 15. This wall 21 terminates at 22 in a plane slightly below the lower end 23 of the boss 7. This plane is above the plane of the surface 11 of the valve disk 10 when such disk occupies its extreme open position. The device 12 may, if desired, be provided with lugs as 24 whereby to facilitate screwing of the same into engagement with the threads of the passage 6.

The removable plug 1ª permits of the insertion of the valve seat device and the valve within the casing. In placing the valve seat device in operative position within the casing the plug 1ª is first removed and the device 12 is screwed down into the passage 6 by means of a suitable tool engaging the lugs 24. A cutting tool may then be introduced, if desired, for removing the lugs 24 in order to leave the passage 14 free and unobstructed. A suitable tool is then employed for bending over the member 17 until the same constitutes a flange 18 as shown in Fig. 1. As thus mounted in the casing, the seat forming device is immovable and is enabled to withstand the shocks and vibrations to which such a valve is subjected in service without becoming displaced. The valve member 10 is then put in position and the cap 1ᵃ screwed down into place. With the parts in this position, fluid entering the chamber 3 rises in the passage 14 and lifts the valve disk 10 from its seat. Such fluid, however, is constrained to continue its upward movement by the wall 21 until it has reached a plane above the valve disk. After passing such plane the fluid may flow laterally toward the discharge 4. As the fluid in passing the valve disk is caused to travel in a direction axially thereof it exerts no substantial side thrust upon the valve and thus any tendency to cause looseness or play between the valve stem and its guide with the consequent unequal wear of the valve seat is avoided. Not only is the valve disk 10 guarded against lateral fluid thrust in all its positions, but its stem is also similarly guarded by the boss 7 in which it is guided, and as the valve floats up upon the stream of fluid, the latter takes the form of an annular sheet whose direction is unchanged until after passing the exposed portions of the valve.

When the valve seat device 13 has become worn so that the valve fails properly to seat thereon, it may be removed by introducing a proper cutting tool for removing the flange 18, whereupon the device may be unscrewed from the passage 6 and replaced with a new device of the same character. It is thus evident that the device as herein disclosed provides not only against the injurious effect of lateral fluid thrusts upon the movable valve member, but also permits the replacement of the valve seat when worn by the action of high velocity fluid, while at the same time provision is made against any possibility of accidental displacement of the valve seat forming device while in use.

Having thus described the invention in a preferred embodiment, together with the mode of use of the same, what I claim and desire to secure by Letters Patent of the United States is:

1. A check valve comprising inlet and discharge chambers having a valve opening therebetween, said discharge chamber having a lateral discharge opening, a valve member freely movable toward and from said valve opening, a stem projecting from the valve member, guide means for the stem and means for guarding said valve member against lateral thrust of the fluid as the latter passes into the discharge chamber.

2. A check valve comprising a casing having a passage for the flow of fluid, an annular valve seat arranged in said passage, a discharge chamber having a lateral outlet whose axis is disposed at an angle to that of said passage, a valve member freely movable toward and from said seat, a stem fixedly secured to said valve member for guiding it in its movements, and means for guarding said stem and said valve member from lateral thrust of fluid as the latter passes over the valve seat and into said discharge chamber on its way to the outlet.

3. A check valve comprising a casing having inlet and discharge chambers, and an opening therebetween, an annular valve seat surrounding said opening, a freely movable valve member cooperating with said seat, said valve member having a stem, guide means for said stem, and an imperforate wall member extending from said seat into the discharge chamber and surrounding said valve member in all positions of movement thereof.

4. A valve seat device for use in check valves comprising a substantially cylindrical member having an annular valve seat at one end, an imperforate wall upstanding from said member and surrounding the valve seat; a radial flange member outstanding from said cylindrical member adjacent the valve seat end thereof, and a bendable element at the opposite end of said device constructed and arranged to be forced outwardly to form a second radial flange, said cylindrical member being externally screw threaded intermediate said radial flange and the bendable element.

5. A check valve comprising a casing having inlet and discharge chambers and an internally screw threaded passage therebetween, a valve seat device having screw threaded engagement with the interior of said passage, radial flanges extending from said device at opposite ends of said passage, a valve seat at one end of said device, an imperforate annular wall surrounding said seat, and a freely movable valve cooperating with said seat.

Signed by me at Boston, Massachusetts, this thirty-first day of January 1921.

BELVIN T. WILLISTON.